United States Patent [19]

Andersson

[11] Patent Number: 5,280,972
[45] Date of Patent: Jan. 25, 1994

[54] PIPE JOINT

[75] Inventor: Joakim Andersson, Anderstorp, Sweden

[73] Assignee: Forsheda AB, Forsheda, Sweden

[21] Appl. No.: 834,931

[22] Filed: Feb. 13, 1992

[30] Foreign Application Priority Data

Mar. 1, 1991 [SE] Sweden .................................. 9100583

[51] Int. Cl.⁵ ........................ F16L 17/00; F16L 19/00; F16L 49/00
[52] U.S. Cl. .................................... 285/230; 285/344; 285/910
[58] Field of Search ............... 285/230, 231, 350, 344, 285/910

[56] References Cited

U.S. PATENT DOCUMENTS

| | | | |
|---|---|---|---|
| 3,510,140 | 5/1970 | Hermann ..................... | 285/344 |
| 3,836,622 | 9/1974 | Sporre . | |
| 4,361,336 | 11/1982 | Reeh et al. ..................... | 285/230 |
| 4,522,669 | 6/1985 | Nordin . | |
| 4,583,771 | 4/1986 | Wästerberg . | |
| 4,850,602 | 7/1989 | Goldstein et al. ................ | 285/230 |
| 4,946,175 | 8/1990 | Nordin et al. ..................... | 285/230 |
| 5,058,907 | 10/1991 | Percebois et al. ................ | 285/230 |

FOREIGN PATENT DOCUMENTS

412797 3/1980 Sweden .
452722 12/1987 Sweden .
2033293A 5/1980 United Kingdom .

Primary Examiner—Neill R. Wilson
Attorney, Agent, or Firm—Baker & Daniels

[57] ABSTRACT

A pipe joint comprising two sealing surfaces (6, 36) one positioned on each of two end portions (2, 4) of two pipes and a sealing device comprising a sealing ring (18). The sealing surfaces (6, 36) form a cylindrical sealing space in which the sealing ring (18) is compressed. In connection with the sealing ring there is in one of the pipe end portions arranged a circumferential cavity (34) partially receiving the elastic material of the sealing ring (18). The sealing surfaces (6, 36) form sealing space portions having a small and substantially equal space width on either side of the sealing ring (18) in the axial direction of the joint for forming supports for carrying transverse loads on either side of the sealing ring.

18 Claims, 6 Drawing Sheets

PIPE JOINT

BACKGROUND OF THE INVENTION

1. Field of the Invention

The present invention relates to a pipe joint.

2. Description of the Related Art

A previously known pipe joint comprises two sealing surfaces provided at separate end portions of two pipes, the sealing surfaces being adapted to be axially forced together to a position in which one of the sealing surfaces encloses the other sealing surface for constituting the pipe joint. Thereby, the sealing surfaces form a substantially cylindrical or somewhat conical sealing space. The pipe joint also comprises a sealing device which after the sealing surfaces have been forced together is positioned in said sealing space. The sealing device comprises a sealing ring which before the sealing surfaces are forced together is positioned axially indisplaceable in relation to one of the sealing surfaces and is compressed between the sealing surfaces while the sealing surfaces are forced together, the sealing ring thereby being axially displaced in relation to the other sealing surface.

Pipe joints of this kind are previously known from for example the Swedish patent specifications Nos. 7809451-3 and 8105254-0. The pipe joints shown and described in these patent specifications comprise a sealing ring consisting of rubber or rubber-elastic material which is positioned at the inner surface of a concrete pipe socket. The sealing ring has a main body and a fastening portion manufactured unitarily therewith and moulded into the pipe material. The inner surface of the pipe socket forming the sealing surface thereof has axially outside the sealing ring a portion of less diameter than the portion positioned axially inside the sealing ring. This difference of the diameters provides an undercut space positioned inside the sealing ring, in which space the main body of the sealing ring can be partially received at the compression thereof taking place when the pipe joint is provided, i.e. when the main body is compressed between the sealing surface of the socket and the sealing surface formed by the outer surface of the spigot end introduced into the socket.

A drawback of pipe joints of the kind described above is insufficient properties with regard to the capacity of taking up and standing transverse loads, i.e. such loads on the pipes causing the pipe end portions forming the pipe joint to be displaced from a concentric towards an eccentric position. Thus, the transverse loads provide that the sealing surfaces are locally displaced towards each other to a position in which the sealing surfaces locally engages each other and/or the sealing ring is locally subjected to a compression of such a magnitude that the transverse loads are balanced.

SUMMARY OF THE INVENTION

The object of the invention is to provide a pipe joint of the kind described above having improved properties with regard to the capacity of standing transverse loads but also in other respects.

In order to comply with this object the pipe joint according to the invention is characterized in that the pipe end portion on which the sealing ring is positioned has in connection with the sealing ring a circumferential cavity adapted when the joint is provided by axially forcing the sealing surfaces together partly to take up the elastic material of the sealing ring and that the sealing surfaces are adapted after the providing of the pipe joint to form sealing space sections which on both sides of the sealing ring in the axial direction of the joint have a small and substantially equal space width for providing a transverse load carrying support on either side of the sealing ring.

In the pipe joint according to the invention there is also, at substantial transverse loads, avoided the risk of such damages to the pipe and the sealing ring which may jeopardize the tightness of the pipe joint.

In a preferred embodiment of the pipe joint according to the invention an elastic material is positioned in the sealing space sections positioned on either side of the sealing ring and having small and substantially equal space width. Thereby there is provided a distribution of the pressure between the transverse load receiving supports on either side of the sealing ring which further reduces the risk of damages to the pipe material at large transverse loads.

In the last mentioned embodiment of the pipe joint according to the invention it is advantageous to arrange the elastic material positioned in the sealing space sections as two layers of elastic material contacting each other, one of the layers engaging one of the sealing surfaces and the other engaging the sealing ring and the other sealing surface. Thereby, the layers of elastic material are adapted to facilitate the displacement for forcing together the sealing surfaces by the fact that the layers slides along each other while substantially indisplaceably engaging the sealing surfaces and the sealing ring. The layers of elastic material are suitably formed by a thin-walled hose arranged in a flat position.

BRIEF DESCRIPTION OF THE DRAWINGS

The invention is described in the following with reference to the accompanying drawings.

DESCRIPTION OF THE PREFERRED EMBODIMENT

Figure 1:
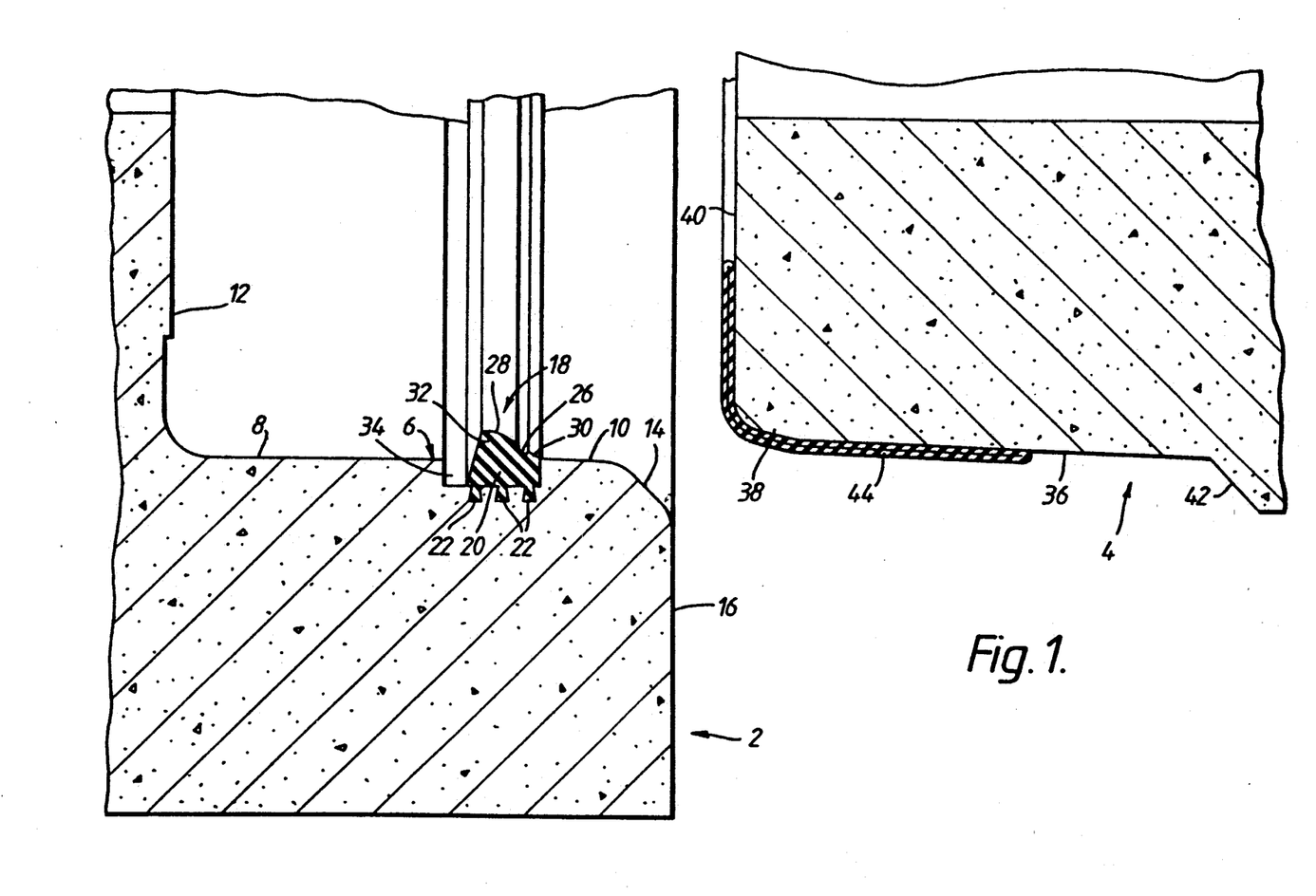
FIG. 1 is an axial section of a pipe joint according to the invention before the jointing has taken place.

FIG. 1 is a section of the walls of the end portions of two concrete pipes adapted to form a pipe joint according to the invention. One of the pipes forms at its end portion a socket 2 while the other pipe forms at its end portion a spigot 4. The socket 2 has an inner sealing surface 6 consisting of an axially inner portion 8 and an axially outer portion 10. The inner portion 8 of the sealing surface 6 merges into an inner annular surface 12 through a chamfer. The outer portion 10 of the sealing surface 6 merges into an annular end surface 16 through a conical entrance surface 14. The surface portions 8 and 10 are substantially cylindrical and have substantially the same diameter. However, the outer surface portion 10 can be slightly conical so that this portion have a somewhat increasing diameter in the direction towards the end surface 16.

In the socket there is at the sealing surface 6 arranged a sealing ring 18 having a main body 20 and fastening portions 22 formed in one unit therewith. The fastening portions 22 having a dovetailed section extend around the outer periphery of the sealing ring 18 and are moulded into the concrete material forming the pipe socket. The main body 20 of the sealing ring 18 is partly embedded in the concrete material of the socket 2 so that only a portion 24 of the main body 20 of the sealing ring 18 is positioned outside the plane of the sealing surface 6. The portion 24 of the sealing ring 18 positioned outside the sealing surface 6 forms a conical surface 28 provided with circumferential grooves 26 and having adjacent the axially outer portion 10 of the sealing surface 6 the same diameter as this portion and connects therewith and having decreasing diameter towards the interior of the socket. In the embodiment shown the conical surface 28 of the sealing ring 18 forms an angle of about 35° with the plane of a sealing surface 6. The groove 26 in the conical surface 28 defines two sections of the portion 24, a smaller, outer portion 30 having a smaller diameter.

Axially inside the sealing ring 18 there is in the sealing surface 6, i.e. in the inner portion 8 of the sealing surface, formed a circumferential cavity 34 having in the embodiment shown its bottom positioned in the same plane as the outer surface of the main body 20 of the sealing ring 18.

The spigot end 4 has an outer sealing surface 36 which at its axially outer surface connects with a conical entrance surface 38 in turn merging into the free end surface 40 of the spigot end. At its axially inner end the sealing surface 36 connects with a conical surface 42 in turn merging into the outer envelope surface of the pipe. The sealing surface 30 is slightly conical having increasing diameter from the entrance surface 38 in the direction of the conical surface 42. In the embodiment shown the sealing surface 36 has a conicity of 2°, and the entrance surface has a conicity of 13°.

On the spigot end 4 there is provided a sliding skin 44 consisting of a flattened, annular, thin-walled elastic material hose preferable consisting of rubber. In the position shown in FIG. 1 forming the starting position for forming the pipe joint according to the invention the sliding skin 44 is stretched around the axially outer portion of the sealing surface 36, the entering surface 42 and the free end surface 40 up to about the center thereof. Thus, in this position the sliding skin 44 forms two thin layers of elastic material contacting each other and between which a lubricant is preferably positioned. The layers of the sliding skin can have a thickness of about 2 mm, so that the sliding skin has a total thickness of about 4 mm. In the flattened position the sliding skin has an axial dimension which is about the same as the axial dimension of the sealing surface 36 or somewhat smaller than this. In an embodiment of the invention the inner surfaces of the two layers of the sliding skin engaging each other can have a wave-shaped section so that the surfaces around the annular sliding skin form depressions and projections.

Figure 2:
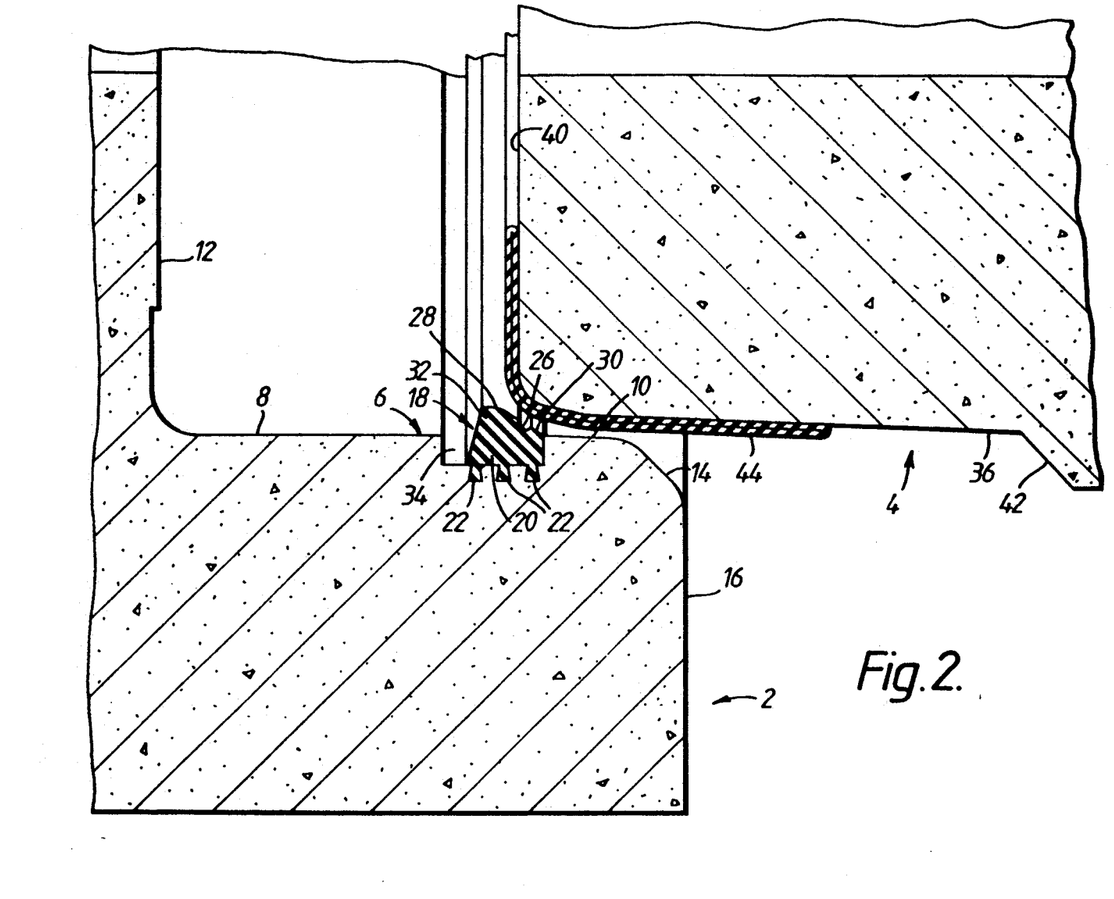
FIG. 2 is a section corresponding to FIG. 1 showing the jointing operation.

FIG. 2 shows the introductory phase of the movement for axially forcing the pipes together for forming the pipe joint according to the invention. Thus, the sealing surfaces 6 and 36 of the socket 2 and the spigot end 4, respectively, have been displaced from the starting position according to FIG. 1 axially towards each other to a position in which the sliding skin 44 has started its engagement with the axially outer surface portion 10 of the sealing surface 6. The total thickness of the sliding skin 44 is adapted to the difference between the diameters of the sealing surfaces 6 and 36 so that the sliding skin will at the axial displacement of the sealing surfaces 6 and 36 fill out the space between the sealing surfaces. This means that the outer surface of the sliding skin 44 will when the sealing surfaces 6 and 36 are axially forced together engage the axially outer portion 10 of the sealing surface 6. Thereby, the two layers of the sliding skin 44 will slide against each other while the engagement with the respective sealing surface takes place without any relative displacement.

At the continuing axial movement of the sealing surfaces 6 and 36 for forcing the surfaces together the sliding skin 44 will roll between the sealing surface 36 on one side and the sealing surface 6 and the sealing ring 18 on the other side. When the spigot end 4 and the sliding skin 44 are displaced over the sealing ring 18 the main body 20 thereof will be successively compressed until the sealing ring takes the position shown in FIG. 3. According to FIG. 3 the main body 20 of the sealing ring 18 has been compressed in such a way that the circumferential cavity positioned adjacent the sealing ring 18 has been completely filled up by the elastic material of the sealing ring. The whole sealing space, i.e. the space between the sealing surfaces 6 and 36, is of substantially the same width and is substantially completely filled by the sliding skin 44.

Figure 3:
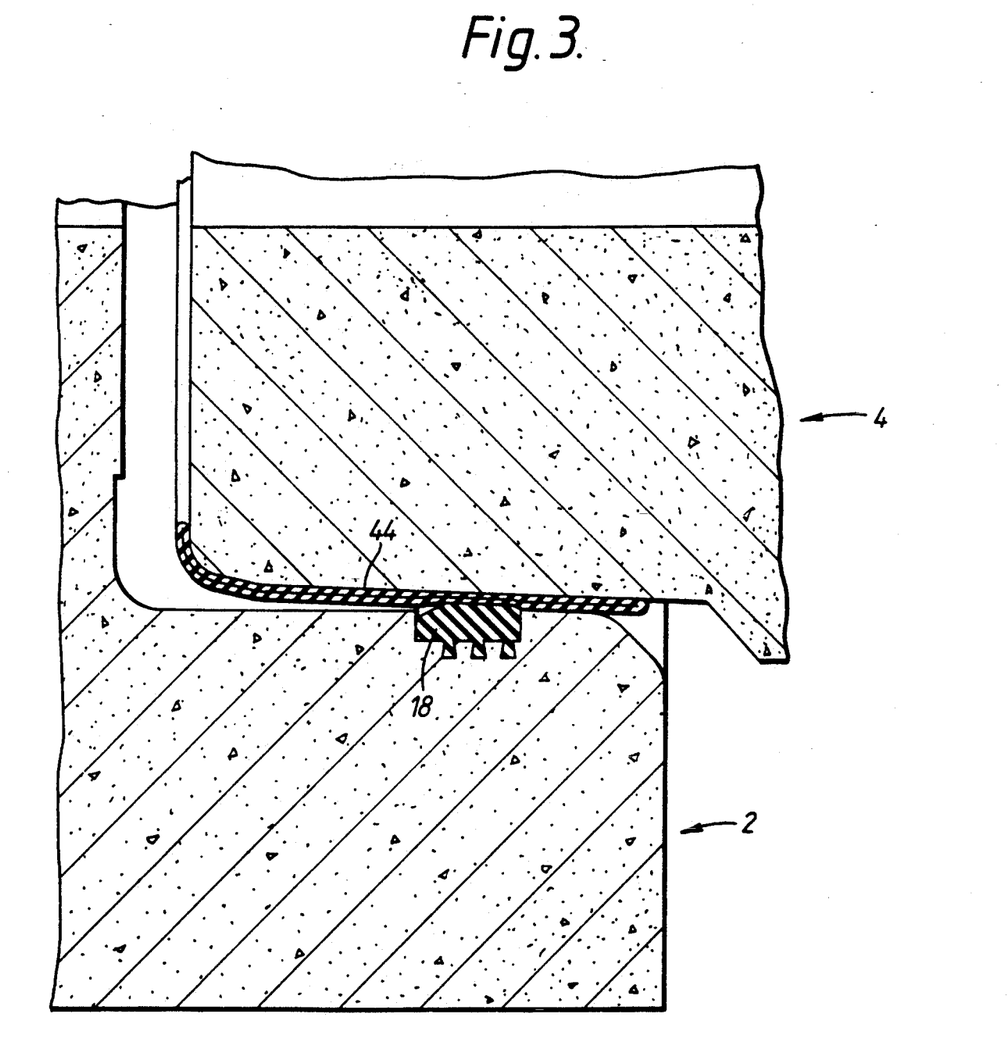
FIG. 3 is a section corresponding to FIG. 1 and 2 of the pipe joint after the joint has been completed.

The groove 26 in the conical outer surface 28 of the sealing ring 18 provides that the portion 32 of the main body 20 having the largest diameter can at the engagement with the sliding skin supported by the spigot end 4 turn somewhat to a position in which the portion of the conical surface 28 belonging to said portion 32 of the main body is parallel with the opposite surface of the sliding skin so that the contact surface between the sealing ring and the sliding skin will have a substantial size in the axial direction.

When the pipe joint according to the invention is subjected to transverse loads, i.e. a loading on the pipes striving to displace the pipe end portions connected with each other from the concentric position so that the sealing space locally takes a smaller width, the stresses thereby created will be distributed over substantially the whole length of the space between the sealing surfaces 6 and 36 with the sliding skin 44 constituting an intermediate liner. This provides a distribution of the transverse load over a large surface and a corresponding less stress on the sealing surfaces and the socket and spigot of the pipe. The sliding skin 44 thereby has a double function facilitating the mounting movement when the pipe joint is established and providing a distribution of the stresses when the joint is subjected to transverse loads. The recesses and projections at the inner surfaces of the two layers of the sliding skin will engage each other so as to provide a certain locking action obstructing the separation of the pipe joint. The design of the pipe joint according to the invention also provides that the elastic material of the joint, i.e. the material of the sealing ring and the sliding skin, independently of the magnitude of the transverse loads will be subjected to a restricted compression obviating such stresses on the elastic material that may lead to a deterioration of the sealing properties thereof.

Figure 4A:
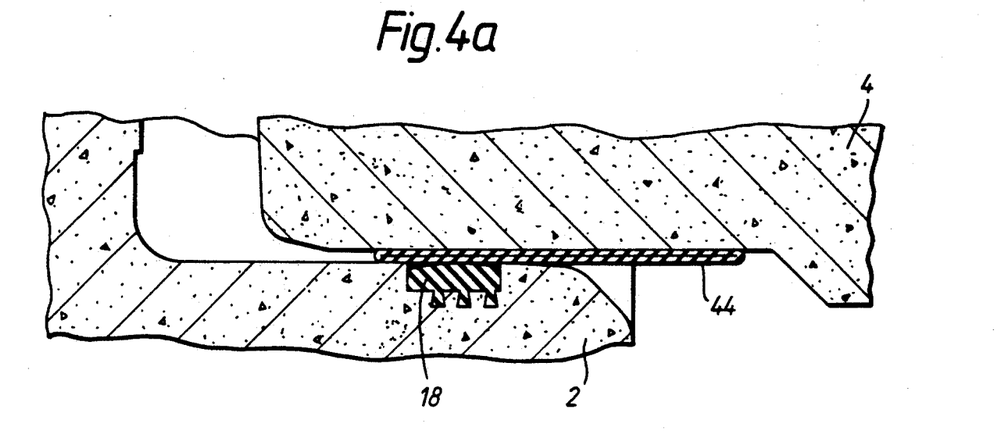
FIG. 4a and 4b show the pipe joint according to FIG. 3 at two different angle positions between the pipes forming the pipe joint.
Figure 4B:
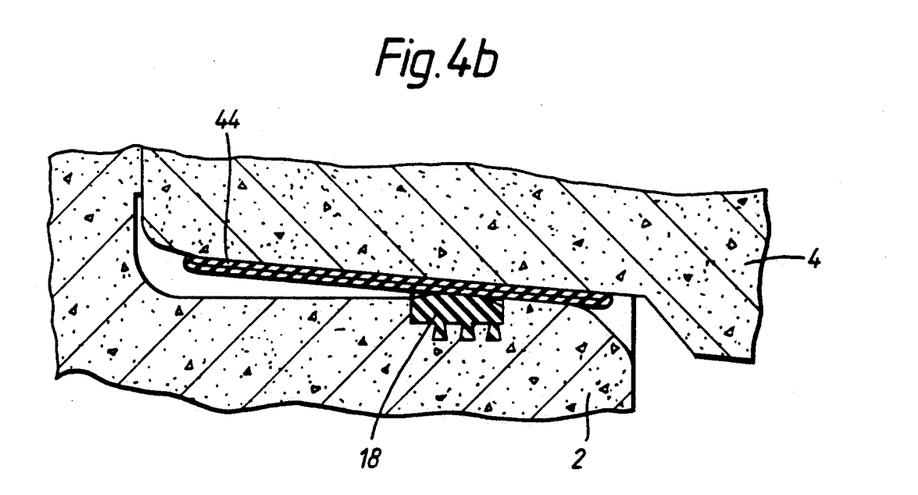

FIGS. 4a and 4b show the pipe joint according to the invention with different relative positions between the spigot end and the socket end with regard to the angular position and the degree of insertion. The figures show that the pipe joint according to the invention can take different angular positions and positions with regard to the degree of insertion while maintaining its capacity of taking up and distributing transverse loads.

Figure 5A:
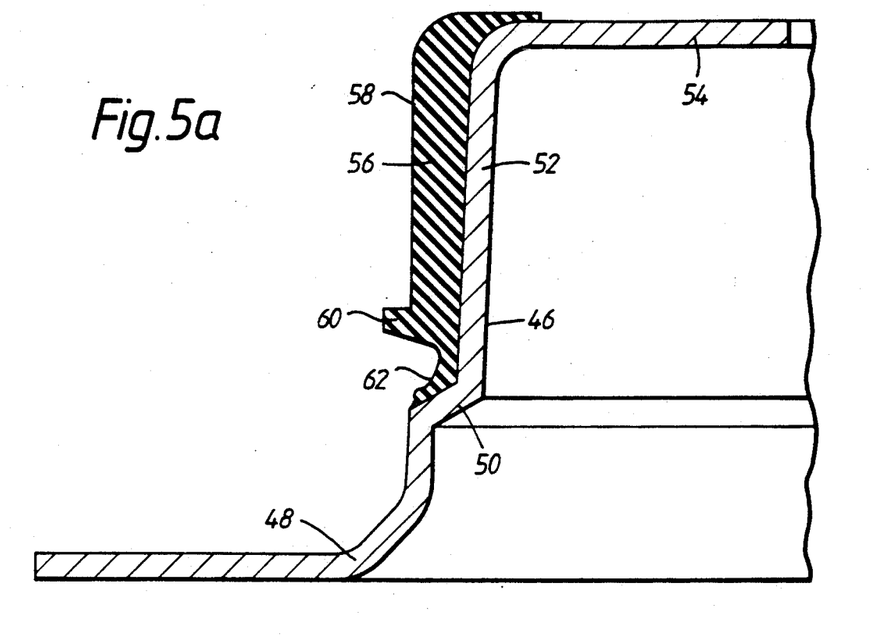
FIG. 5a and 5b show the manufacturing of an end portion of a pipe included in the joint shown in FIGS. 1-4.
Figure 5B:
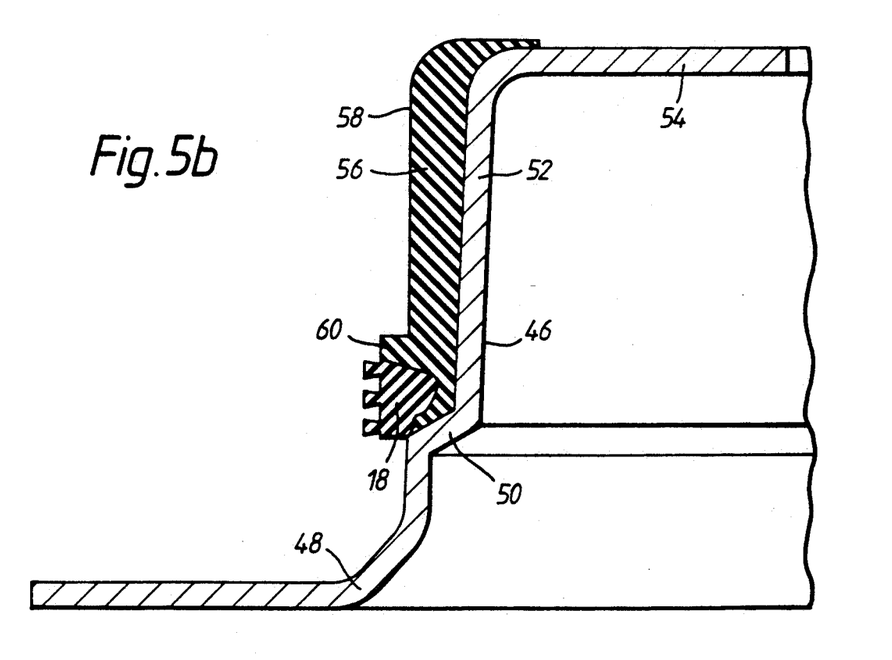

FIGS. 5a and 5b show the manufacturing of the concrete pipe comprising the socket 2 of the pipe joint according to the invention. The wall of the pipe is defined by two concentric cylindrical mould portions which are arranged in a vertical position. The socket end of the pipe is formed at the lower part of the mould by means of a so called bottom ring 46, thus positioned in the lower portion of the mould space between the cylindrical mould portions and terminating the mould space in downward direction. In FIG. 1 there is only shown the part of the mould which is constituted by the bottom ring 46.

At its lower part the bottom ring 46 has a portion 48 the inner surface of which is adapted to define the annular end surface 16, the conical entrance surface 14 and the outer sealing surface portion 10 of the socket 2. Above the portion 48 thus directly constituting the mould surfaces for said surface portions of the socket the bottom ring 46 has a conically tapering portion 50, a substantially cylindrical portion 52 formed with a certain relief and a radially inwardly extending portion 54. The radially inwardly extending portion 54 forms at its upper surface the mould surface defining the inner, annular surface 12 of the pipe socket.

Prior to the moulding of the pipe provided with the socket there is positioned on the cylindrical portion 52 and the conically tapering portion 50 of the bottom ring a rubber mould portion 56 with a certain stretching. The inner surface of the mould portion 56 directly connects with the conically tapering portion 50, the cylindrical portion 52 formed with a certain relief and the chamfer between the last mentioned portion and the radially inwardly extending portion 54. At its outer surface the mould portion 56 forms a cylindrical mould surface 58 for defining the inner portion 8 of the sealing surface 6 of the socket 2 and the connection between the portion 8 of the sealing surface 6 and the inner annular surface 12. The mould portion 56 also has an outer, circumferential projection 60 which is adapted to form the circumferential cavity 34 formed in the sealing surface 6 and a circumferential groove 62 positioned adjacent the projection 60. The groove 62 has a section which is designed so as to allow that the groove 62 with a tight connection receives the surface of the sealing ring, turned into the socket and being free in relation to interior of the socket and the cavity 34.

After the mould portion 56 has been stretched around the bottom ring 46 as shown in FIG. 5a the sealing ring 18 is positioned on the mould portion as shown in FIG. 5b. The largest portion of the main body 20 of the sealing ring is thus received in the groove 62 of the mould portion 56. In FIG. 5b the surfaces of the sealing ring 18 which shall be moulded into concrete material of the socket are free, said surfaces being constituted by the fastening portions 22 of the sealing ring 18 and one side of the main body 20.

When positioning the mould portion 56 and the sealing ring 18 on the bottom ring 46 it is of course also possible first to arrange the sealing ring 18 in the groove 62 of the mould portion 56 and thereupon to position the mould portion 56 with the sealing ring 18 on the bottom ring 46.

After the concrete has been moulded into the mould and the concrete has hardened the stripping takes place which as a last measure includes the removal of the rubber mould portion 56. Thereupon the pipe socket has the appearance shown in FIG. 1 with the sealing ring 18 moulded into the concrete material of the socket and the cavity 34 positioned axially outside the sealing ring 18.

It is possible to modify the design of the bottom ring and the rubber mould portion in different ways, and for example the conical portion 18 of the bottom ring can be formed for directly contacting the conical surface 28 of the sealing ring, the rubber mould portion 56 thus lacking the portion positioned between the conical portion of the bottom ring 50 and the conical portion 28 of the sealing ring 18. In this modified embodiment the cylindrical portion 52 of the bottom ring and the surface of the mould portion adapted to contact this cylindrical portion extends along the dotted line 64 in FIG. 5b.

Figure 6:
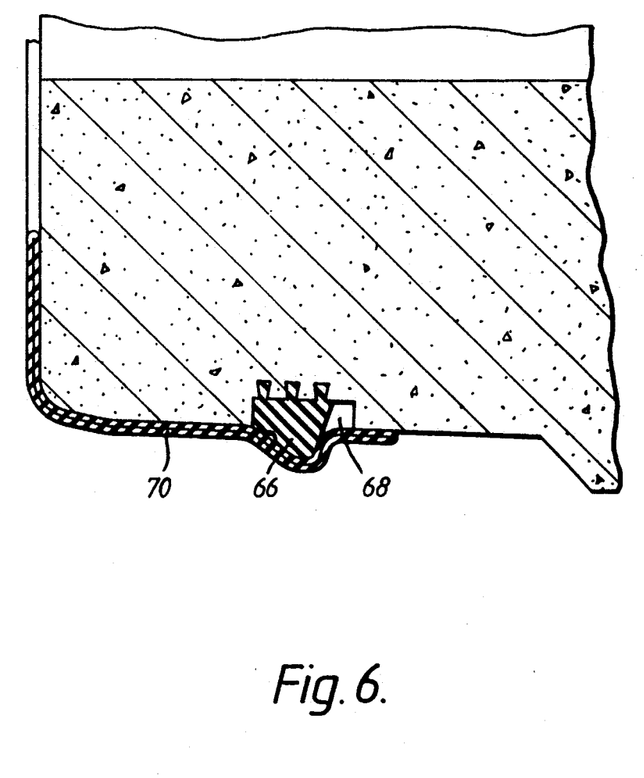
FIG. 6 is an axial section corresponding to FIG. 1 of a modified embodiment of a pipe joint according to the invention.

FIG. 6 shows a modified embodiment of the pipe joint according to the invention. Thus, FIG. 6 shows a section of the wall of two end portions of two concrete pipes adapted to form this modified pipe joint. The embodiment according to FIG. 6 differs from the embodiment according to FIG. 1-5 in the respect that the sealing ring 66 is arranged in the sealing surface of the spigot end instead of in the sealing surface of the socket. This provides that the sealing ring 66 and the cavity 68 corresponding to the cavity 64 in the embodiment according to FIGS. 1-5 before the pipe joint is provided, i.e. while the pipes which shall form the pipe joint are stored and transported, take a protective position under the sliding skin 70. For the rest there are no functional differences between the embodiments shown in respect of the forming of the pipe joint and the capacity of the pipe joint for taking up transverse loads and so on.

The invention can be modified within in the scope of the following claims.

What is claimed is:

1. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;

wherein an elastic material is positioned in the sealing space sections positioned on either side of the sealing ring and having a small and substantially equal space width;

the sealing space having a small space width over the main part of its axial length and that the elastic material fills at least the main part of the sealing space;

the elastic material consisting of two elastic material layers contacting each other and each of the sealing surfaces and the sealing ring, the elastic material layers being adapted when the sealing surfaces are axially forced together to slide along each other while substantially indisplaceably engaging the respective sealing surface and the sealing ring;

the elastic material layers contacting each other are of annular shape and are stretched around one of the sealing surfaces formed on a spigot end of one of the pipe end portions.

2. A pipe joint as claimed in claim 1, characterized in that the elastic material layers contacting each other have an axial length which is somewhat less than the axial length of the sealing surfaces.

3. A pipe joint as claimed in claim 1, characterized in that the elastic material layers contacting each other in the starting position for axially forcing the sealing surfaces together are stretched around one of the pipe end portions while covering at least a part of the end surface of the pipe end portion and the adjacent part of the sealing surface.

4. A pipe joint as claimed in claim 1, characterized in that the pipe end portion with which the sealing ring is connected in connection with the sealing ring has a circumferential cavity adapted partially to receive the elastic material of the sealing ring when the joint is provided by axially forcing the sealing surfaces together.

5. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;

wherein an elastic material is positioned in the sealing space sections positioned on either side of the sealing ring and having a small and substantially equal space width;

the sealing space having a small space width over the main part of its axial length and the elastic material fills at least the main part of the sealing space;

the elastic material consisting of two elastic material layers contacting each other and each of the sealing surfaces and the sealing ring, the elastic material layers being adapted when the sealing surfaces are axially forced together to slide along each other while substantially indisplaceably engaging the respective sealing surface and the sealing ring;

the elastic material layers contacting each other in the starting position for axially forcing the sealing surfaces together are stretched around one of the pipe end portions while covering at least a part of the end surface of the pipe end portion and the adjacent part of the sealing surface.

6. A pipe joint as claimed in claim 5, characterized in that the pipe end portion with which the sealing ring is connected in connection with the sealing ring has a circumferential cavity adapted partially to receive the elastic material of the sealing ring when the joint is provided by axially forcing the sealing surfaces together.

7. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;

the sealing space having a somewhat increasing space width portion adjacent the small and substantially equal space width in the direction of the interior part of the space.

8. A pipe joint as claimed in claim 9, characterized in that the pipe end portion with which the sealing ring is connected in connection with the sealing ring has a circumferential cavity adapted partially to receive the elastic material of the sealing ring when the joint is provided by axially forcing the sealing surfaces together.

9. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;

wherein an elastic material is positioned in the sealing space sections positioned on either side of the sealing ring and having a small and substantially equal space width;

the sealing space having a small space width over the main part of its axial length and the elastic material fills at least the main part of the sealing space;

the elastic material consisting of two elastic material layers contacting each other and each of the sealing surfaces and the sealing ring, the elastic material layers being adapted when the sealing surfaces are axially forced together to slide along each other while substantially indisplaceably engaging the respective sealing surface and the sealing ring;

the sealing ring and the elastic material layers contacting each other are positioned on the same pipe end portion and that the elastic material layers contacting each other, before the sealing surfaces are axially forced together forms a protective covering over the sealing ring and the cavity positioned adjacent the sealing ring.

10. A pipe joint as claimed in claim 9, characterized in that the pipe end portion with which the sealing ring is connected in connection with the sealing ring has a circumferential cavity adapted partially to receive the elastic material of the sealing ring when the joint is provided by axially forcing the sealing surfaces together.

11. A pipe joint comprising two sealing surfaces, one positioned on each of two portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;
- wherein an elastic material is positioned in the sealing space sections positioned on either side of the sealing ring and having a small and substantially equal space width;
- the sealing space having a small space width over the main part of its axial length and the elastic material fills at least the main part of the sealing space;
- the elastic material consisting of two elastic material layers contacting each other and formed by a flattened, thin-walled hose, and each of the sealing surfaces and the sealing ring, the elastic material layers being adapted when the sealing surfaces are axially forced together to slide along each other while substantially indisplaceably engaging the respective sealing surface and the sealing ring;
- the elastic material layers contacting each other are of annular shape and are stretched around one of the sealing surfaces formed on a spigot end of one of the pipe end portions.

12. A pipe joint as claimed in claim 11, characterized in that the pipe end portion with which the sealing ring is connected in connection with the sealing ring has a circumferential cavity adapted partially to receive the elastic material of the sealing ring when the joint is provided by axially forcing the sealing surfaces together.

13. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;
- wherein an elastic material is positioned in the sealing space sections positioned on either side of the sealing ring and having a small and substantially equal space width;
- the sealing space having a small space width over the main part of its axial length and the elastic material fills at least the main part of the sealing space;
- the elastic material consisting of two elastic material layers contacting each other and formed by a flattened, thin-walled hose, and each of the sealing surfaces and the sealing ring, the elastic material layers being adapted when the sealing surfaces are axially forced together to slide along each other while substantially indisplaceably engaging the respective sealing surface and the sealing ring;
- the elastic material layers contacting each other in the starting position for axially forcing the sealing surfaces together are stretched around one of the pipe end portions while covering at least a part of the end surface of the pipe end portion and the adjacent part of the sealing surface.

14. A pipe joint as claimed in claim 13, characterized in that the pipe end portion with which the sealing ring is connected in connection with the sealing ring has a circumferential cavity adapted partially to receive the elastic material of the sealing ring when the joint is provided by axially forcing the sealing surfaces together.

15. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;
- wherein an elastic material is positioned in the sealing space sections positioned on either side of the sealing ring and having a small and substantially equal space width;
- the sealing space having a somewhat increasing space width portion adjacent the small and substantially equal space width in the direction of the interior part of the space.

16. A pipe joint as claimed in claim 15, characterized in that the pipe end portion with which the sealing ring is connected in connection with the sealing ring has a circumferential cavity adapted partially to receive the elastic material of the sealing ring when the joint is provided by axially forcing the sealing surfaces together.

17. A pipe joint comprising two sealing surfaces, one positioned on each of two end portions of two pipes, the sealing surfaces being adapted axially to be forced together to a position in which one of the sealing surfaces encloses the other sealing surface while forming a cylindrical or somewhat conical sealing space and further comprising a sealing device positioned in the sealing space thus formed and comprising a sealing ring which is connected with one of the pipe end portions and is compressed in the sealing space, characterized in that the sealing surfaces are adapted after the establishment of the pipe joint to provide sealing space sections having a small and substantially equal space width on either side of the sealing ring in the axial direction of the joint for forming supports for carrying the transverse loads on either side of the sealing ring;
- wherein an elastic material is positioned in the sealing space sections positioned on either side of the sealing ring and having a small and substantially equal space width;
- the sealing space having a small space width over the main part of its axial length and the elastic material fills at least the main part of the sealing space;
- the elastic material consisting of two elastic material layers contacting each other and formed by a flattened, thin-walled hose, and each of the sealing surfaces and the sealing ring, the elastic material layers being adapted when the sealing surfaces are axially forced together to slide along each other while substantially indisplaceably engaging the respective sealing surface and the sealing ring;
- the sealing ring and the elastic material layers contacting each other are positioned on the same pipe end portion and that the elastic material layers contacting each other, before the sealing surfaces are axially forced together forms a protective covering over the sealing ring and the cavity positioned adjacent the sealing ring.

18. A pipe joint as claimed in claim 17, characterized in that the pipe end portion with which the sealing ring is connected in connection with the sealing ring has a circumferential cavity adapted partially to receive the elastic material of the sealing ring when the joint is provided by axially forcing the sealing surfaces together.

* * * * *